United States Patent [19]
Leist et al.

[11] Patent Number: 5,282,521
[45] Date of Patent: Feb. 1, 1994

[54] SHELL DISC BRAKE

[75] Inventors: Scott R. Leist, Centerville; Robert W. Hyde, Dayton; Norbert J. Green, Jr., Trotwood; Robert N. Dawson, Huber Heights; Irl S. Wallace, Centerville, all of Ohio

[73] Assignee: General Motors Corporation, Detroit, Mich.

[21] Appl. No.: 955,811

[22] Filed: Oct. 2, 1992

[51] Int. Cl.$^5$ .............................................. F16D 65/20
[52] U.S. Cl. ........................... 188/73.47; 188/73.39; 188/73.45
[58] Field of Search ............... 188/73.44, 73.45, 73.47, 188/73.31, 73.39, 72.4, 72.5, 71.1, 320; 92/171.1

[56] References Cited

U.S. PATENT DOCUMENTS

| | | | |
|---|---|---|---|
| 3,781,068 | 12/1973 | Brooks | 188/72.4 X |
| 4,031,986 | 6/1977 | Thompson | 188/72.4 |
| 4,341,289 | 7/1982 | Smith | 188/73.45 X |
| 4,540,068 | 9/1985 | Ritsema | 188/73.39 |
| 4,613,018 | 9/1986 | Weiler et al. | 188/72.4 |
| 4,856,620 | 8/1989 | Thiel et al. | 188/72.4 |

FOREIGN PATENT DOCUMENTS

| | | | |
|---|---|---|---|
| 108680 | 5/1984 | European Pat. Off. | 188/73.47 |
| 3539606 | 12/1986 | Fed. Rep. of Germany | 188/370 |
| 4020669 | 1/1992 | Fed. Rep. of Germany | |
| 1105308 | 11/1955 | France | 188/370 |
| 2233411A | 1/1991 | United Kingdom | |

*Primary Examiner*—Robert J. Oberleitner
*Assistant Examiner*—Kevin D. Rutherford
*Attorney, Agent, or Firm*—Ernest E. Helms

[57] ABSTRACT

A disc brake with a caliper housing having first and second side walls, the first wall having a cavity with a piston slidably mounted therein, the piston having a first shoe for frictional engagement with one of the sides of a rotor, the housing also having a bridge spanning the sides of the rotor and extending from the bridge, the housing having a second wall with an attached second shoe for frictional engagement with the rotor opposite the first shoe. A bracket is connected with the vehicle having first leading and second trailing reaction arms. The caliper is slidably mounted with the bracket arms. Extending the piston from the caliper housing to actuate the brake brings the shoes into engagement with the rotor and causes the inboard shoe to react on the trailing bracket arm and the caliper housing to react in the trailing direction into the leading bracket arm.

2 Claims, 7 Drawing Sheets

SHELL DISC BRAKE

FIELD OF THE INVENTION

The field of the present invention is that of automotive vehicle disc brakes and methods of utilization thereof.

DISCLOSURE STATEMENT

It is known in the art to provide disc brakes for automotive vehicles. In the typical disc brake, a rotor disc is attached to a vehicle wheel. Slidably mounted with respect to the vehicle is a caliper. The caliper slidably mounts a piston along its inboard side. The caliper also has a bridge spanning over the rotor. On an outboard side of the caliper is a side wall (connected to the bridge) which mounts an outboard brake shoe. The outboard shoe is forced into the rotor by the caliper sliding in response to the engagement of an inboard shoe (which is connected to the piston). Due to the forces generated in the caliper when braking the rotor, there is a slight tendency for the outboard shoe to flex outwardly. To prevent the outboard side wall of the caliper from flexing outward, various amounts of metal are added to the bridge to make it more stiff. The stiffening of the bridge significantly adds to the weight of the caliper.

SUMMARY OF THE INVENTION

In order to meet the environmentally mandated goal of reducing vehicle weight, it would be highly advantageous to provide a disc brake caliper which could significantly reduce the amount of metal needed in forming the bridge area of the caliper.

The present invention provides a light-weight caliper comprised of a shell with an insertable piston cylinder. A preferred embodiment of the caliper provides a reaction system which allows the caliper to have a bridge section with far less mass than what was previously known to be allowable.

DETAILED DESCRIPTION OF THE INVENTION

Figure 1:
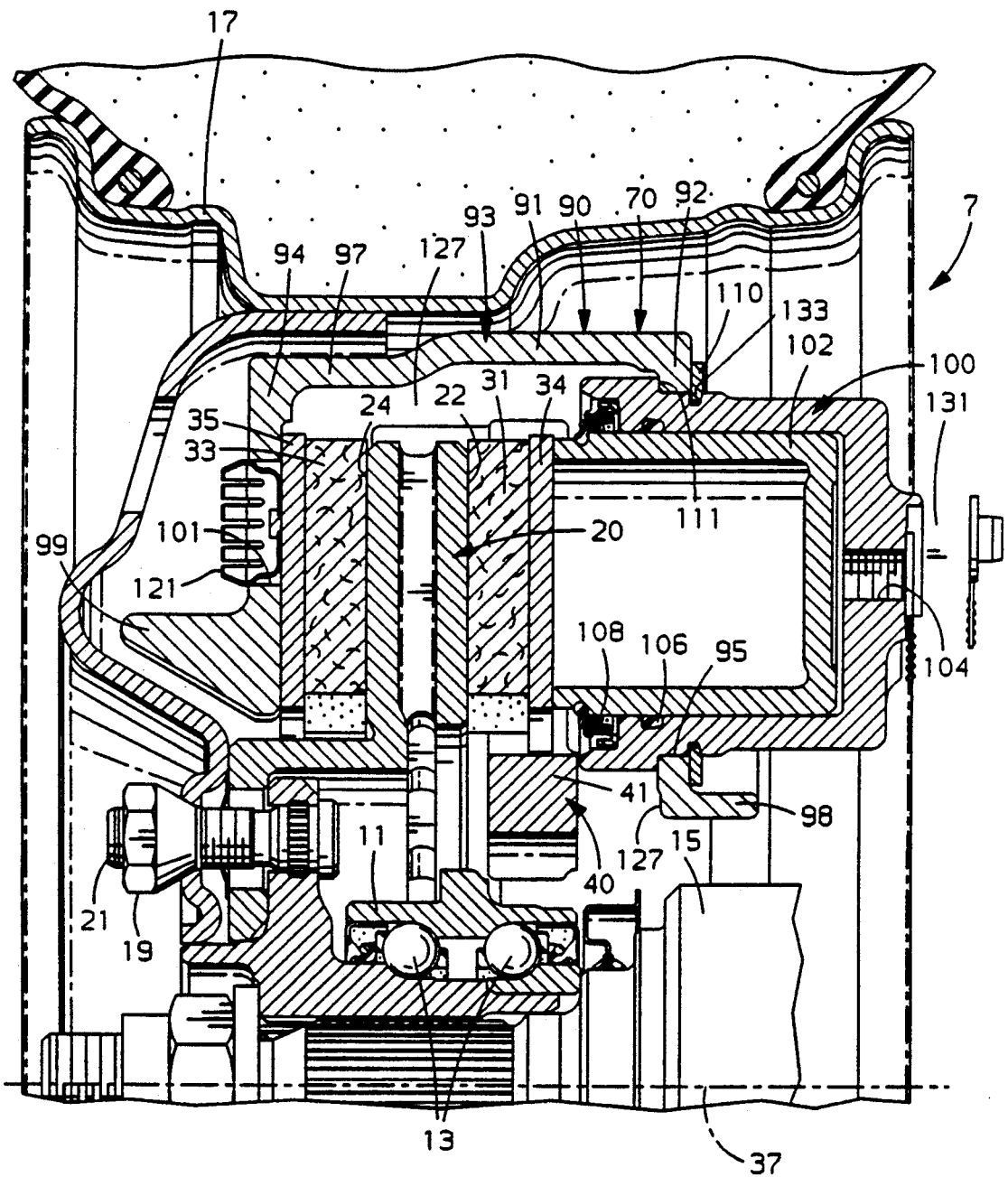
FIG. 1 is a view taken along line 1—1 of FIG. 4.

Referring to FIG. 1, an automotive vehicle which utilizes the present invention has a steering knuckle 11 which, by virtue of a bearing 13, mounts a drive axle assembly 15 to the vehicle. A vehicle wheel 17 is attached to the axial assembly by a series of geometrically-spaced nuts 19, which are threadably engaged with a series of threaded studs 21 fixably connected with axial assembly 15. The stud and nut assembly allows the wheel 17 to capture between itself and the axial assembly 15 a rotor 20 having an inboard friction surface 22 and an outboard friction surface 24. The rotor 20 has a rotational axis 37.

Figure 2:
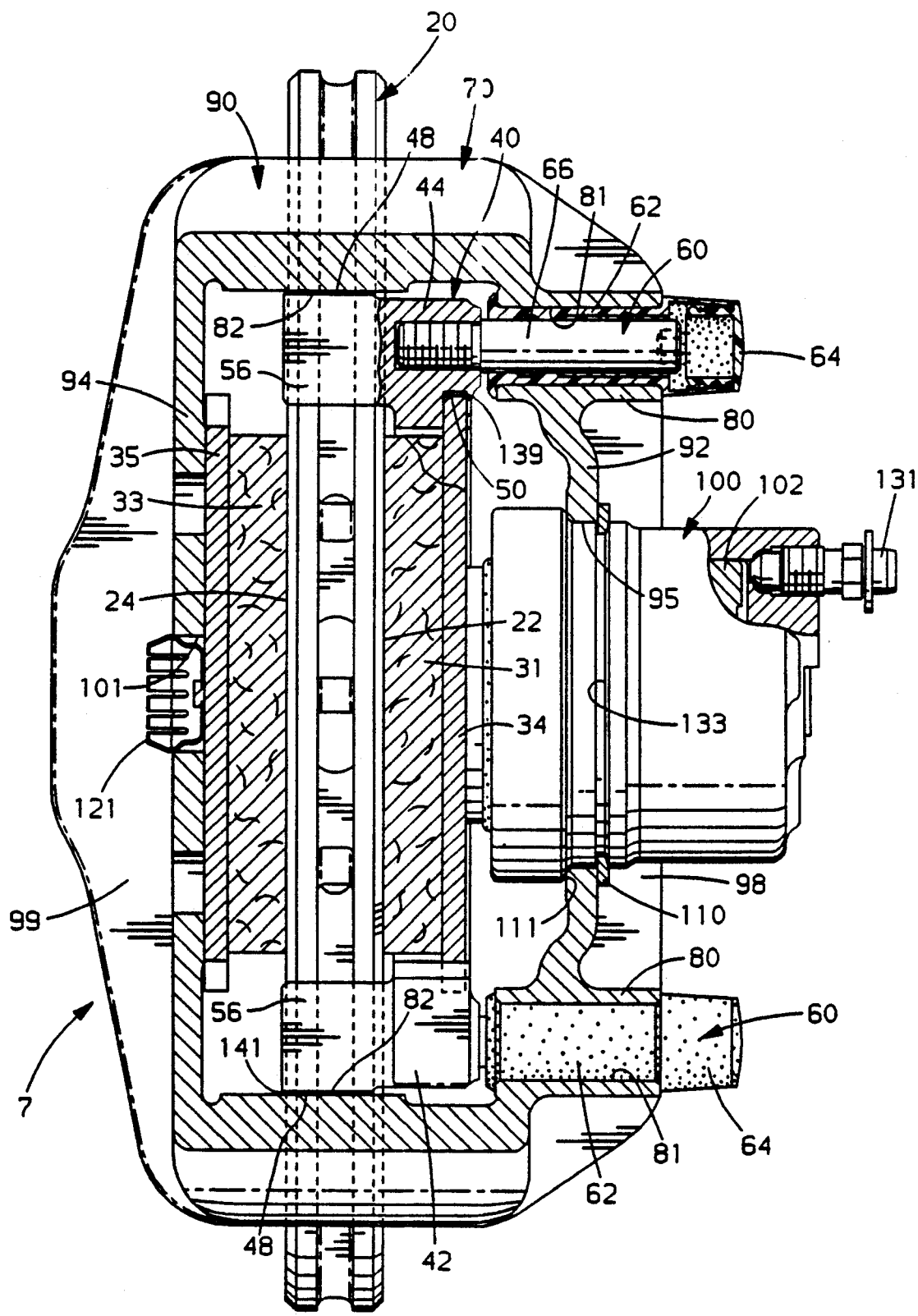
FIG. 2 is an enlarged sectional view, shown partially as a plan view, of the present invention shown in FIG. 4.
Figure 3:
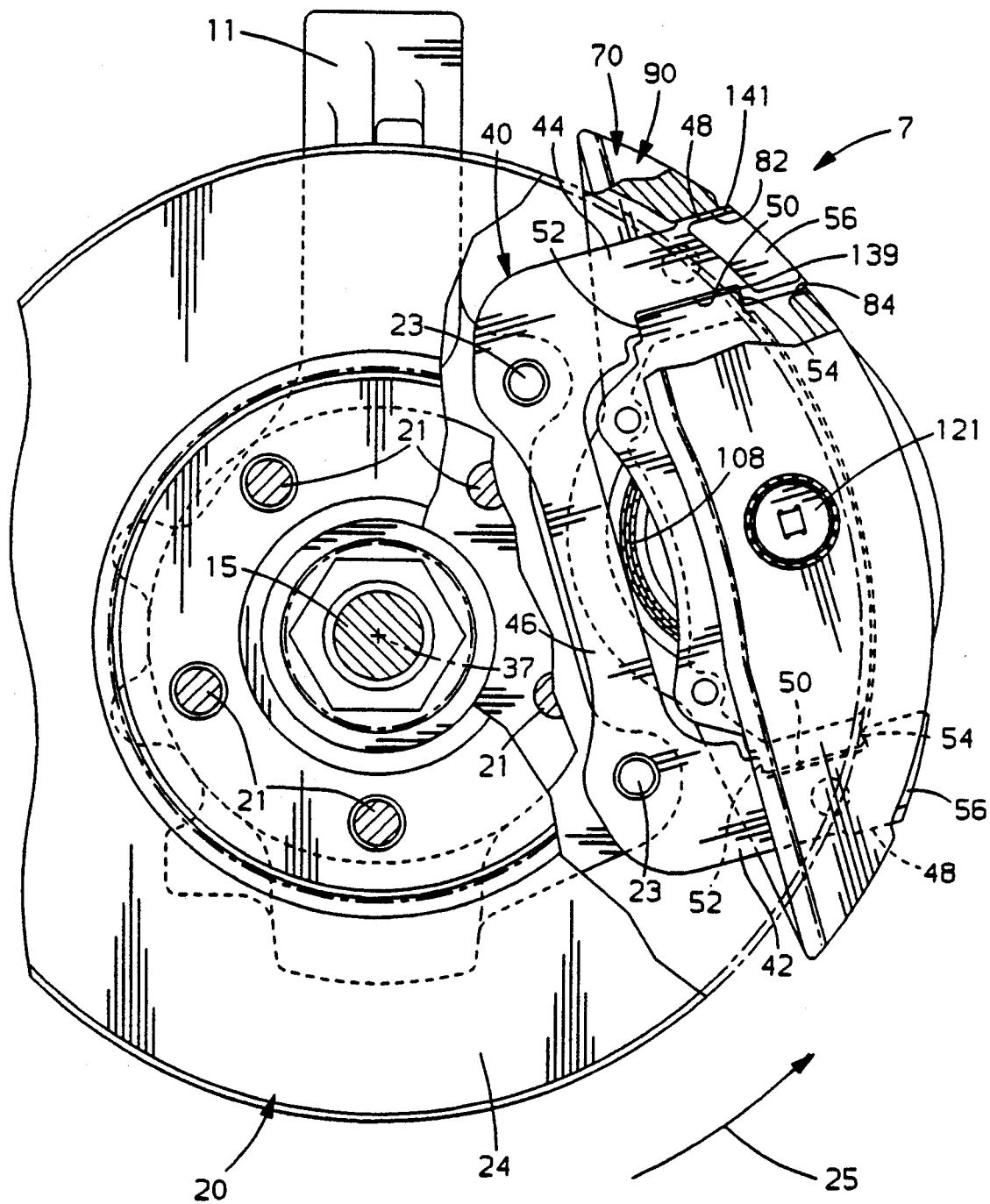
FIGS. 3 and 4 are outboard and inboard plane elevational views of a preferred embodiment brake according to the present invention.
Figure 4:
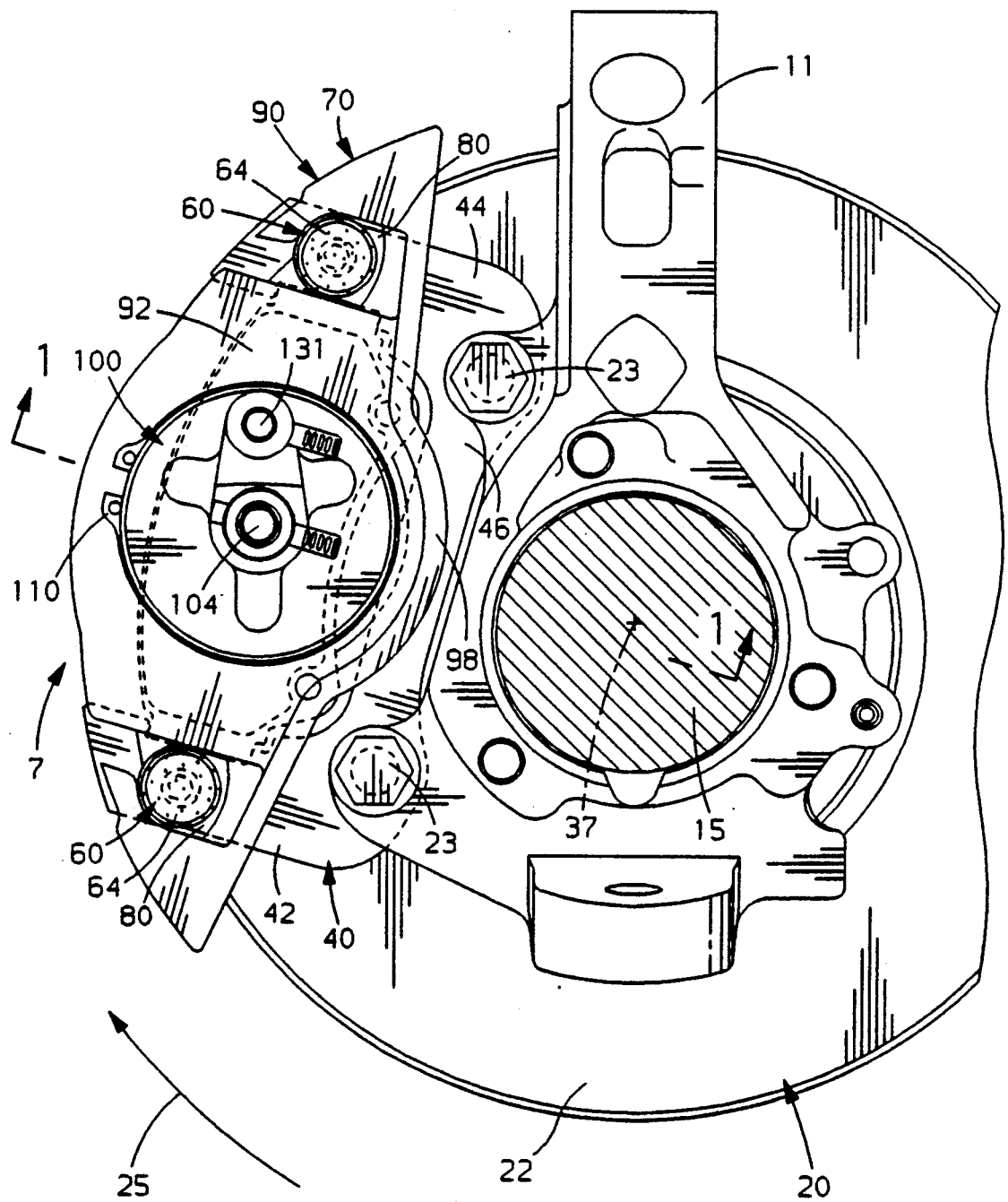
Figure 5:
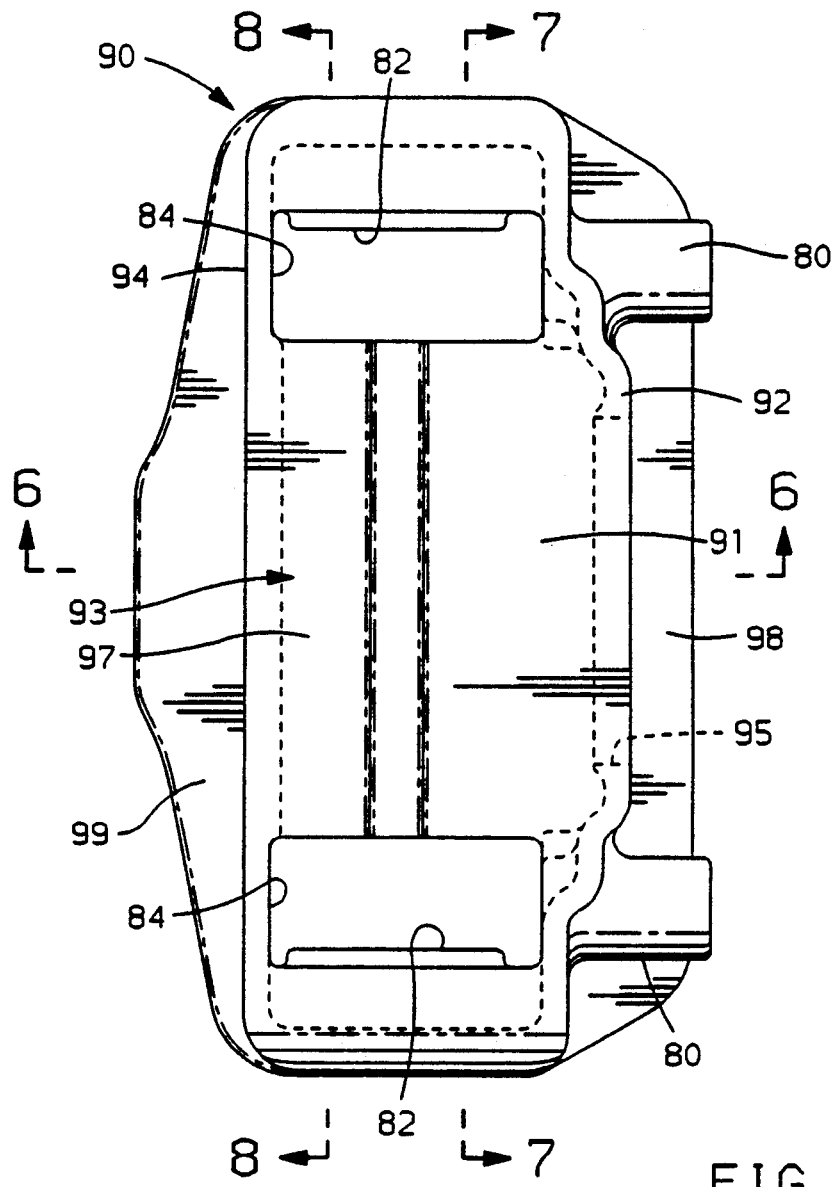
FIG. 5 is a top plan view of a shell of the caliper of the present invention.

Referring additionally to FIGS. 3 and 4, connected to the steering knuckle 11 by two bolts 23 is a U-shaped bracket 40. The bracket 40 has a leading arm 42 and a trailing arm 44. The designation of leading and trailing is dependent upon the rotation of the vehicle wheel. As shown in FIGS. 3 and 4, the rotor 20 is rotating in the direction of arrow 25. Whichever bracket arm the rotor traversed first is referred to as the leading arm, and the other bracket arm is considered the trailing arm. Connecting the bracket arms 42 and 44 is a cross body 46. If desired, the bracket 40 may be integral with the knuckle 11. However, for manufacturing purposes, it is usually found to be preferable that the bracket 40 and knuckle 11 be machined separately and then fixably attached. Each bracket arm has an outward extending finger 56 (FIG. 2) which extends over the rotor 20. Fingers 56 each have an outer contact surface 48. Additionally, each bracket arm has a C-shaped slot 50 (FIG. 3) having lower and upper ends 52 and 54 which provide an inboard shoe entrapment and contact area.

Threadably connected to each bracket arm is a pin assembly 60. Each pin assembly has an elastomeric boot 62 and a cap 64 to entrap grease within the pin assembly 60 and to prevent the entrance of foreign matter on a surface of a pin shaft 66.

Slidably mounted on the pin assembly 60 is a two-piece housing or caliper body 70 (FIG. 2). The caliper body 70 has a shell 90 and a hydraulic cylinder cup 100. The cylinder cup 100 is connected with the shell 90. The shell 90 has two bored bosses 80 which slidably mount the caliper 70 on the pin assemblies 60.

Referring additionally to FIGS. 5 through 8, the shell 90 comprises three main portions, that being an inboard side wall 92, an outboard side wall 94 and, joining the two, a bridge section 93. The inboard wall 92 has an aperture 95 for mounting the cylinder cup 100. On both sides of the shell 90 there is an aperture 84 to allow for insertion of the bracket arms 42 and 44. In a manner to be described later, the contact area 82 is provided for making contact with the reaction contact surface 48 of the bracket arms. The inboard side of the shell 92 as previously described has bosses 80 allowing the shell to mount to the pin assemblies.

The inboard wall 92 also has an L-shaped hoop flange 98 adding rigidity to the shell. In a similar manner, the outboard side 94 of the shell 90 has an L-shaped hoop flange 99. The bridge has at least a radial elevation (taken from axis 37) as low as the highest radial elevation of hoop flanges 98 and 99. In other words, both of the hoop flanges 98 and 99 blend into the bridge 93 of the shell. Bridge 93 has a slightly enlarged portion 91 to provide additional clearance for the installation of the actuating piston. A slightly reduced diameter portion 97 of the bridge 93 blends in with the enlarged section 91. The shell extends for a radius angle 152 of approximately 115 degrees plus or minus 10 degrees (preferably plus or minus two degrees) from the radial center line of the shell bridge to the tip of the bridges 83. The radius of the shell at its lowest point is approximately 135 millimeters (mm), and the distance from a shell crown 81 to the center line of the wheel is 152 mm.

Figure 6:
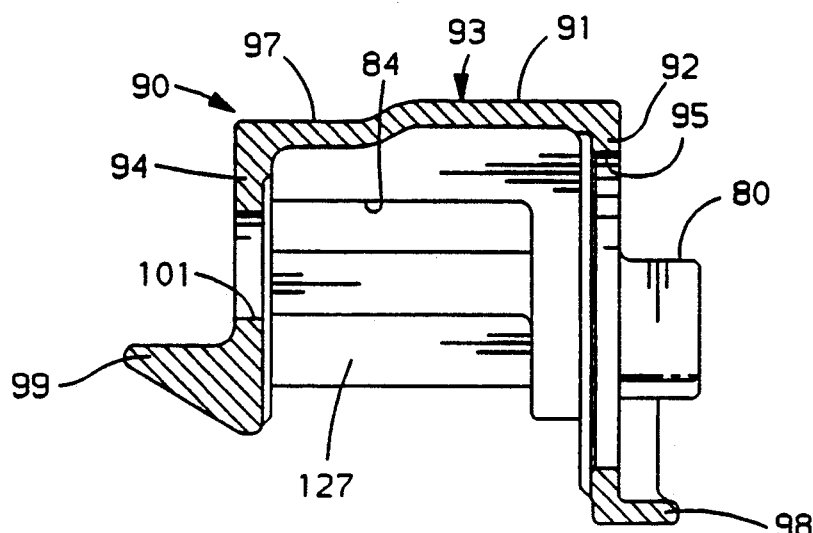
FIG. 6 is a view taken along line 6—6 of FIG. 5.
Figure 7:
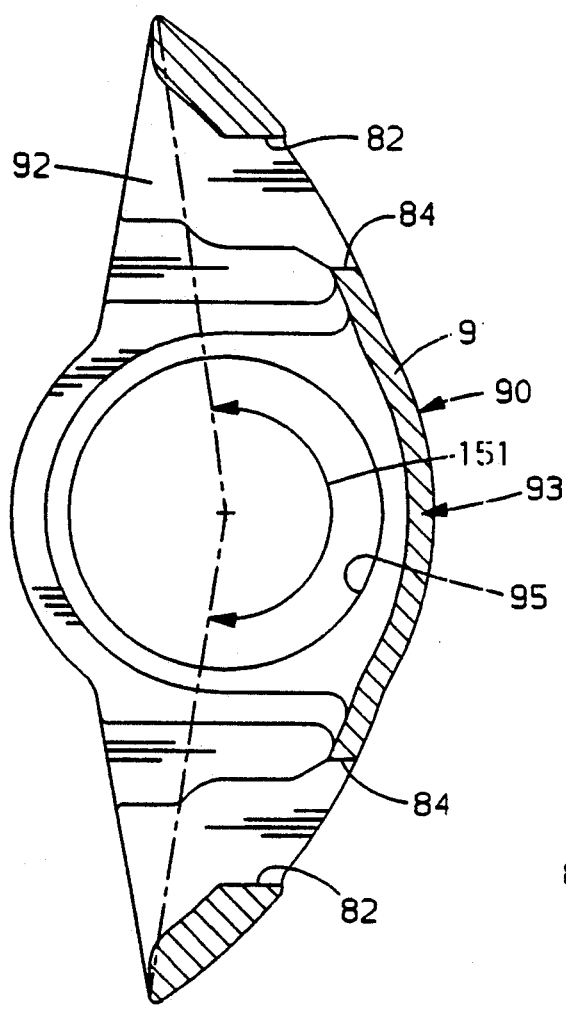
FIGS. 7 and 8 are views taken along lines 7—7 and 8—8, respectively, of FIG. 5.
Figure 8:
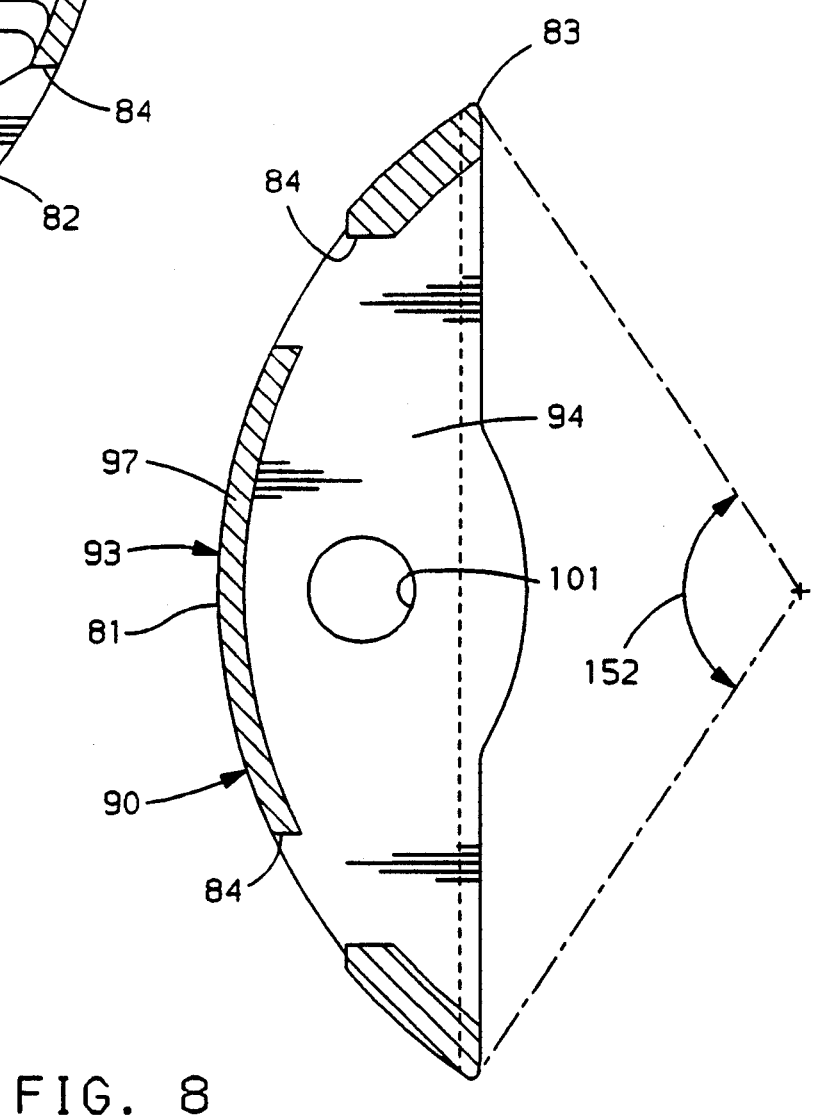

Referring specifically to FIG. 6, the hoop flanges encircle the shell at an angle 151 of approximately 195 degrees plus or minus 10 degrees (preferably plus or minus two degrees) from the center line of a piston 102. Therefore, flexing of the bridge is inhibited by the hoop flanges 98 and 99 which act as binders to prevent the outboard wall 94 from flexing outward.

Therefore, the thickness of the bridge 93 can be lessened, with all other things being considered equal. The extensive included angle of the bridge also inhibits its deflection by virtue of actuation of the disc brake 7. However, in some instances, strengthening ribs may be desirable.

The thinning of the shell bridge 93 provides most of the weight savings associated with the present invention. Additionally, since the cylinder cup 100 is machined and fabricated separate from the shell 90, the outboard wall 94 does not have to be cut out to provide access for machining a bore in the cylinder cup. Therefore, there is greater rigidity.

The outboard wall 94 of the shell also has an aperture 101 to allow for mounting of an outboard brake shoe 33 to the shell 90. As mentioned previously, the cylinder cup 100 is mounted to the shell 90. The cylinder cup 100 may be welded, attached by bolts or, as shown, may be brought into a shell throat area 127 (the area of the shell between the inboard and outboard walls 92, 94) and then extended outward until it mates with the inboard wall 92 by a circular step 111 (FIG. 1). Thereafter, a snap ring 110 encircling locking member fits within a premachined groove 133 in the cylinder cup. The cylinder cup has an inlet 104 for admittance of pressurized fluid, a bleeding port 131 and a slidably mounted piston 102. The piston 102 is sealed within the cylinder cup 100 by seal ring 106 and is protected from admittance of dust by a boot 108 in a conventional manner.

Mounted with the piston 102 is the inboard shoe 31 having a backing plate 34. Mounted by a spring 121 in the aperture 101 in the outboard flange of the shell is the outboard shoe 33 having a backing plate 35. Referring to FIGS. 1 and 2, there is a slight clearance 139 between the inboard shoe backing plate 34 and the reaction contact surface 50 of the trailing bracket arm 44. In like manner, there is a slight clearance 141 between the contact surface 48 of the bracket arm 42 and a contact surface 82 of the shell aperture 84. Actuation of the brake 7 causes the inboard shoe 31 to grip the rotor 20 and travel with the rotor 20 toward the reaction contact surface 50 of the bracket arm 44. Contemporaneously, the engagement of the outboard shoe 33 with the rotor 20 causes the shell 90 to be pulled along with the rotor 20 and contact the bracket arm 42 contact surface 48 via contact surface 82. The shell effectively becomes a tie bar for the bracket arms 42, 44 and, therefore, the conventional tie bar to the bracket arms may be eliminated. Since the clearances 139, 141 previously mentioned are smaller than the clearance between the pin 60 and the bore 81 of the boss 80, reaction forces do not significantly occur to the pin assembly 60, and smooth sliding motion of the caliper body 70 along an axis parallel to the rotation axis 37 is further assured. The contact area 48, by being further away from the inboard shoe 31, counters the tendency of the brake caliper body 70 to pull in an outboard direction along the leading end of the brake actuation.

A reversal of the direction of wheel 17 causes the brake 7 to operate in identical fashion except that the inboard shoe now will react into the arm 42 instead of 44. In a like manner, the shell will now react into the bracket arm 44. Since the cylinder cup 100 is only concerned with the pressure forces involved and since no reaction forces act upon it, it can be fabricated from materials having a lighter weight (such as aluminum) and also can be machined, fabricated and tested off-line, adding to machining flexibility.

Figure 9:
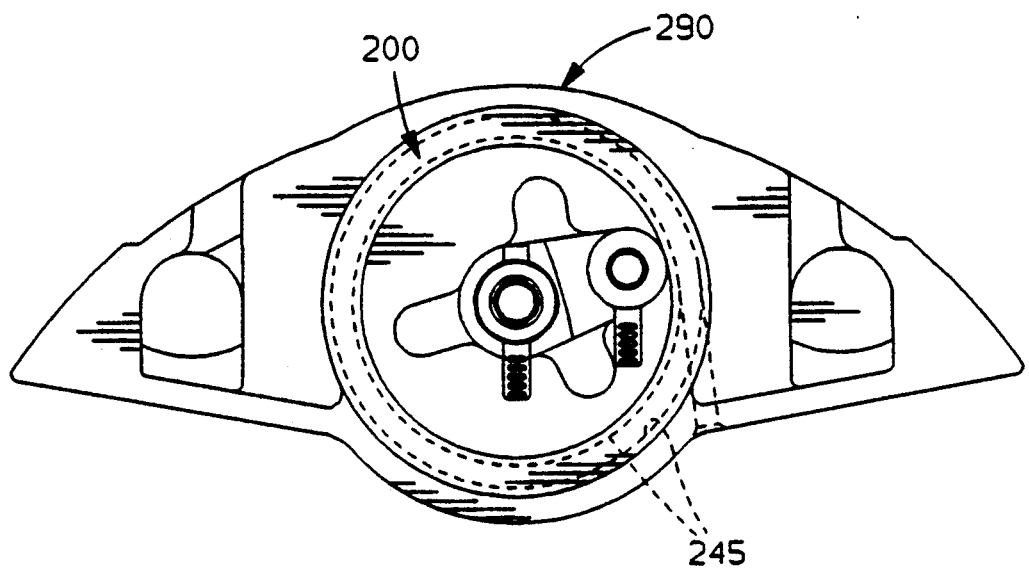
FIGS. 9 and 10 provide alternate preferred embodiments of the present invention to that shown in FIG. 4.
Figure 10:
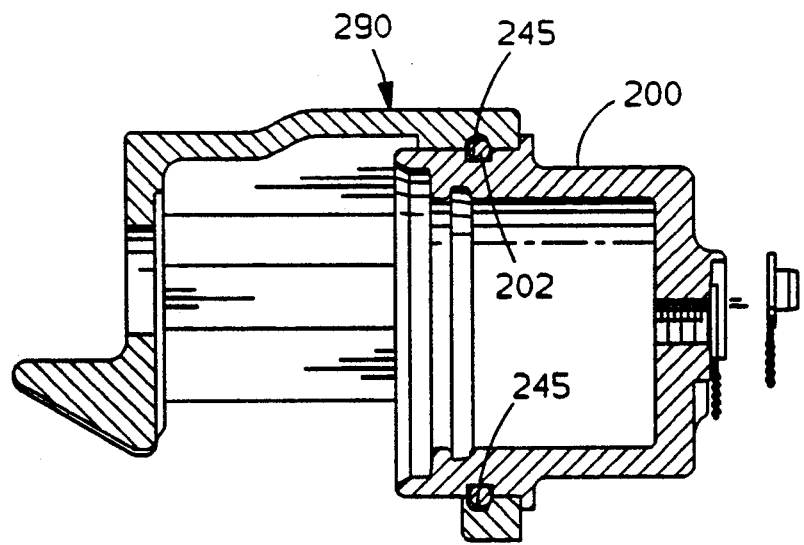

In the embodiments shown in FIGS. 1 through 8, assembly of the cylinder cup 100 has placement of the cup into the throat area 127 and then extending the cylinder cup 100 outward through the aperture 95 in the inboard wall of the shell. However, in the embodiments shown in FIGS. 9 and 10, the cup may be assembled from outside of the throat area 127. The cylinder cup 200 and shell 290 have a matching annular groove 245, and a metallic rod material 202 is inserted therein which locks the members together.

While a few of the embodiments of the present invention have been explained, it will be readily apparent to those skilled in the art of the various modifications which may be made to the present invention without departing from the spirit and scope of this application as it is encompassed by the following claims.

The embodiments of the invention in which an exclusive property or privilege is claimed are defined as follows:

1. A disc brake for an automotive vehicle wheel comprising:
    rotor means for connection with the vehicle wheel having inboard and outboard side surfaces and a rotational axis;
    a caliper housing having first and second side walls, the first wall having a cavity with a piston slidably mounted therein, the piston having a first shoe for frictional engagement with one of the sides of the rotor means, the housing also having a bridge spanning the sides of the rotor and extending from the first wall, the bridge having two apertures, each aperture having a contact surface, the housing having a second wall with an attached second shoe for frictional engagement with the rotor opposite the first shoe;
    bracket means connected with the vehicle having first leading and second trailing reaction arms, each arm projecting through an aperture of the housing;
    pin means to slidably mount the first wall of the caliper with the bracket means along an axis generally parallel with the rotational axis of the rotor;
    means to extend the piston from the caliper housing to actuate the brake, bringing the shoes into engagement with the rotor and wherein actuation of the brake causes the first shoe to react on the second trailing reaction arm and the caliper housing aperture contact surface to react into the first leading reaction arm with no significant reaction forces being experienced in the pin means and wherein the entire contact area of the caliper housing with the second trailing reaction arm is closer to the second side wall of the caliper housing than where the first shoe reacts into the first reaction arm.

2. A brake as described in claim 1 wherein the means to extend the piston from the caliper housing is powered hydraulically.

* * * * *